United States Patent
McWethy

[11] Patent Number: 5,284,354
[45] Date of Patent: Feb. 8, 1994

[54] BICYCLE SUSPENSION SYSTEM

[75] Inventor: Robert T. McWethy, Ventura, Calif.

[73] Assignee: Western States Import Company, Inc., Camarillo, Calif.

[21] Appl. No.: 5

[22] Filed: Jan. 4, 1993

[51] Int. Cl.⁵ .............................. B62K 25/28
[52] U.S. Cl. ............................ 280/284; 280/281.1
[58] Field of Search ............... 280/274, 275, 281.1, 280/283, 284, 285, 286, 288.4

[56] References Cited

U.S. PATENT DOCUMENTS 5,217,241  6/1993  Girvin .............................. 280/284

FOREIGN PATENT DOCUMENTS 3504101  4/1986  Fed. Rep. of Germany ...... 280/284
16723  8/1888  United Kingdom ............ 280/281.1

OTHER PUBLICATIONS

"Mountain Bike Action Magazine", Mar., 1992 pp. 63, 66, 71 & 74.

Primary Examiner—Margaret A. Focarino
Assistant Examiner—Kevin Hurley
Attorney, Agent, or Firm—Edward A. Sokolski

[57] ABSTRACT

A swing arm member is pivotally mounted on the frame of a bicycle on one end thereof, in a position which is essentially neutral relative to the bicycle's chain pull and fixedly attached to the rear wheel axle at the other end. A shock absorber is interconnected between the swing arm and a point on the frame along the seat tube thereof. The seat tube, which forms part of the frame, is in one piece and is positioned directly in front of a gusset in the swing arm. The seat tube has an upper portion which receives the seat post and a lower portion offset rearwardly from the upper portion, the lower and upper portions being joined together by a curved portion. The shock absorber is positioned directly behind the curved portion of the seat tube. A brake actuating arm is pivotally mounted on the swing arm and provides additional leverage for actuating the brake.

11 Claims, 2 Drawing Sheets

BICYCLE SUSPENSION SYSTEM

BACKGROUND OF THE INVENTION

1. Field of the Invention

This invention relates to bicycles and more particularly to a suspension system for suspensively supporting the wheel of a bicycle in conjunction with a shock absorber.

2. Description of Related Art

In mountain bikes for use on rough terrain, it is highly desirable to have a suspension system between the wheels and the bicycle frame which operates in conjunction with a shock absorber. Various such suspension systems have been developed in the past, a number of such systems being described in the Mar., 1992 edition of Mountain Bike Action magazine. On page 66 of this magazine a suspension bike identified as the "GP Cycles R.A.D. 1. This describes a bike having a suspension system with a swing arm similar in shape and positioned similarly to the swing arm of the present invention. This bike, however, employs a rather elaborate triangular frame to which the seat tube is joined and has its shock absorber mounted within this triangular frame.

On page 63 of the above indicated magazine a bike identified as the "Off Road Pro-Flex 752 is described. This bike has a suspension system which utilizes a swing arm shaped and positioned somewhat similarly to that of the present invention. However, an elastomeric shock absorber is employed which is mounted high on the frame away from the swing arm. Further, the seat tube employed has a straight conventional configuration.

SUMMARY OF THE INVENTION

The device of the present invention is a suspension system for a bicycle which employs a swing arm which is fixedly attached at one end thereof to the rear axle of the bicycle and pivotally attached to the bicycle frame at the other end. The pivotal attachment of the swing arm to the frame is made at a neutral position with respect to the chain pull, i.e. approximately parallel to the direction of such pull. This neutral positioning of the pivot point of the swing arm tends keep the rear of the bike from either squatting or lunging during hard pedaling The seat tube which supports the seat post of the bike is formed in one piece which is curved and is positioned directly in front of a gusset which joins together a pair of opposing bars which form the swing arm. The upper portion of the curved one piece tube is offset forwardly, the tube being curved rearwardly so that the tube returns to its normal position in the bicycle frame in line with the seat and pedal axle. This one piece construction makes for lighter weight and facilitates assembly with the curved portion providing a recess in which the shock absorber can be mounted in an optimum angular position. The shock absorber is attached on one end thereof to the upper portion of the seat tube and at the other end to the swing arm, positioned at an angle to progressively increase resistance during compression. A brake actuating arm is pivotally mounted on the swing arm and is connected to the brake cable and the brake to provide additional leverage for actuating the brake.

DETAILED DESCRIPTION OF THE INVENTION

Figure 1:
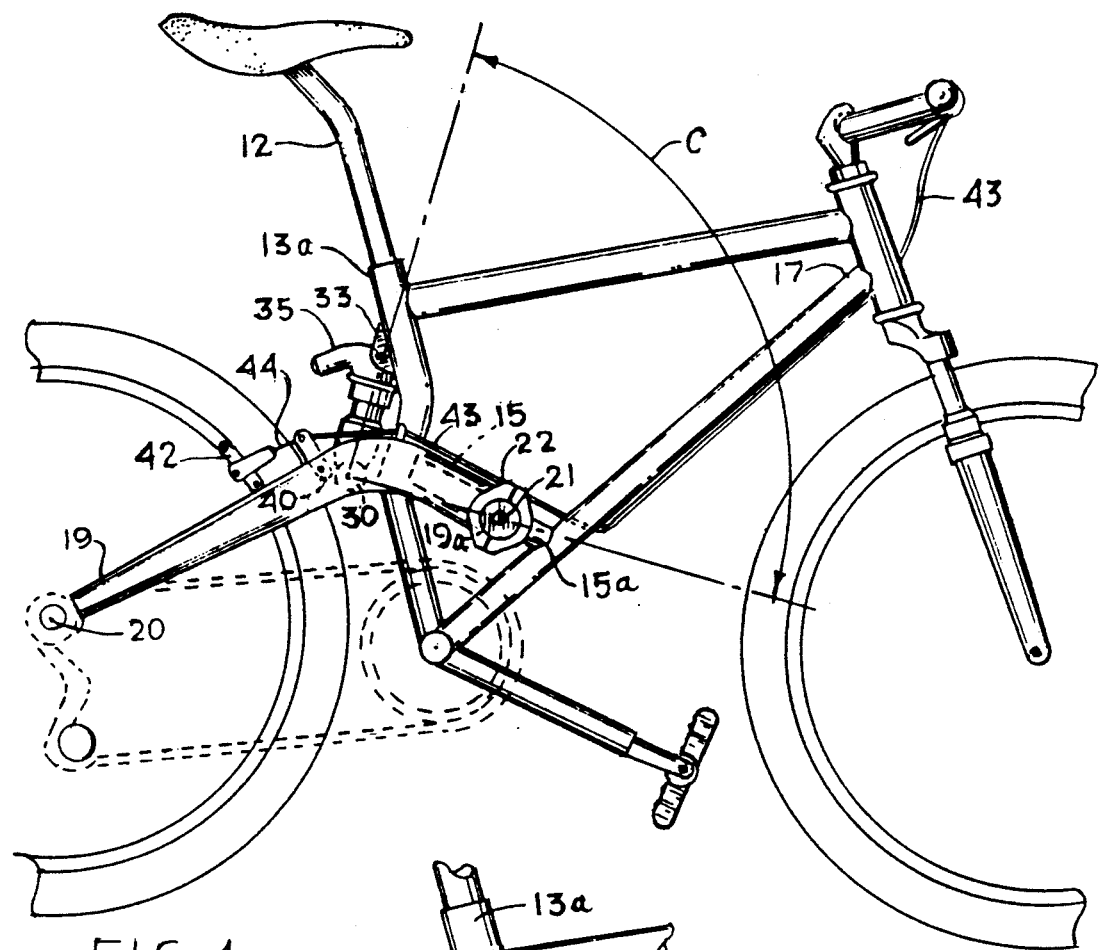
FIG. 1 is a side elevational view showing a preferred embodiment of the invention.
Figure 1A:
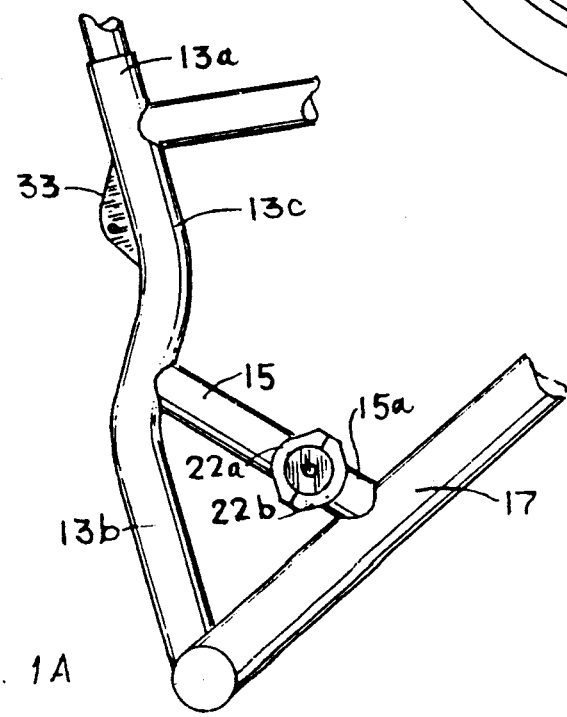
FIG. 1A is a side elevational view showing a portion of the frame of the preferred embodiment in the area of the swing arm.

Referring now to the Figures, a preferred embodiment of the invention is illustrated.

A bicycle has a seat post 12 which telescopically fits within a one piece curved seat tube 13 and can be adjusted vertically relative thereto and clamped in a desired position by means of a clamp (not shown). Seat tube 13 has an upper portion 13a which is offset forwardly from lower portion 13b thereof, the upper and lower portions being joined together by a curved portion 13c. Lower portion 13b is fixedly attached at its bottom end to bar 17 of the bicycle frame. A cross bar 15 extends between curved portion 13c and bar 17.

Swing arm 19 is fixedly attached at one end to the axle 20 of the rear wheel of the bicycle The arm extends upwardly towards tube portion 13c and then has a downward curve and extends downwardly towards cross bar 15. The other end of arm 19 is pivotally attached at point 21 to cross bar 15. As can be best seen in FIGS. 2 and 4, arm 19 has a bushing 19a formed therein which slidably fits over bosses 15a extending from the opposite sides of bar 15. The arm is prevented from falling off the bosses by means of clamps 22a and 22b which are clamped to the opposite ends of the bosses.

Figure 4:
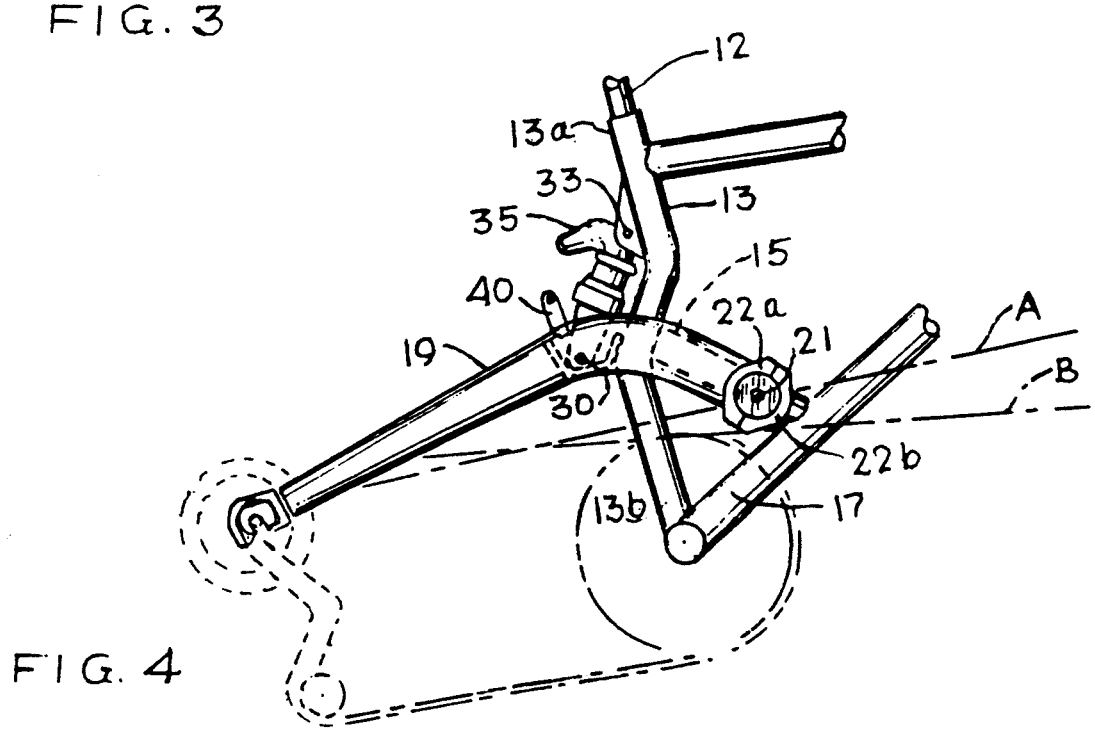
FIG. 4 is a diagrammatic view illustrating the operation of the device of the invention.

Referring to FIG. 4, the swing arm axis "A" and the direction of chain pull B are approximately parallel to each other which tends to keep the rear of the bike from squatting or lunging during hard pedaling.

Figure 2:
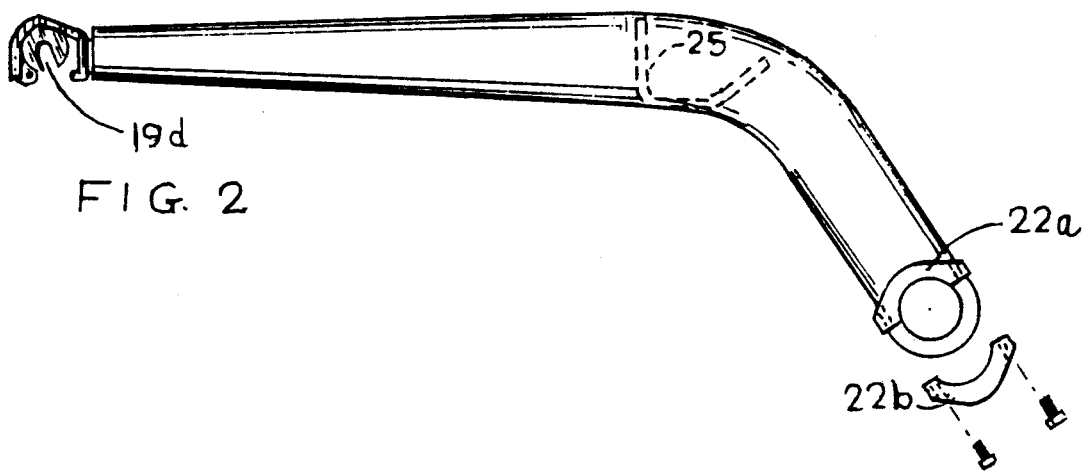
FIG. 2 is a side elevational view of the swing arm of the preferred embodiment.
Figure 3:
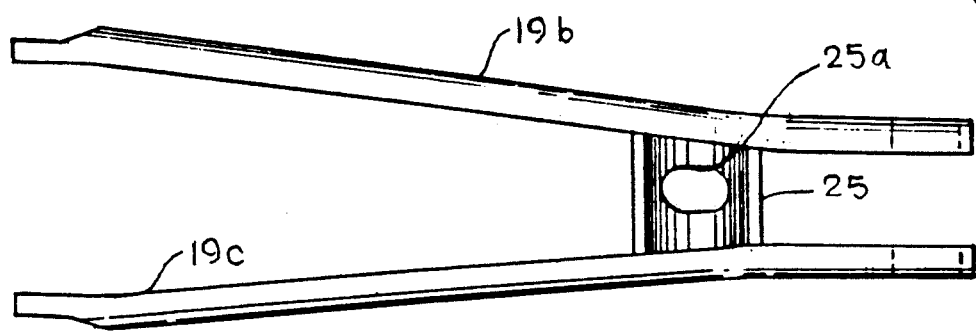
FIG. 3 is a top plan view of the swing arm of the preferred embodiment.

As can best be seen in FIGS. 2 and 3, swing arm 19 is formed by a pair of opposing bars 19b and 19c which have a gusset 25 therebetween, this gusset joining the two bars together to form a unitary structure. Gusset 25 may be welded to the bars or otherwise fixedly attached thereto. The bars have U-shaped end portions 19d which are adapted to fit over the wheel axle of the bicycle. The gusset has an aperture 25a formed therein which is used to accomodate a portion of the shock absorber 35. Curved portion 13c of the seat tube is fitted between the opoposing arms 19b and 19c of the swing arm directly in front of gusset 25.

Pivotally attached at one end to swing arm 19 by means of bolt 30 and at the other end to the upper portion 13a of seat post support tube 13 by means of bolt 33 is shock absorber 35. This shock absorber is preferably an air-oil type absorber such as is commercially available from Marzocchi S.P.A., Bologna, Italy. For optimum performance, this absorber is positioned at an angle "C", as indicated in FIG. 1, which is slightly less than 90 degrees (about 89.5 deg) with the shock fully compressed and about 82 degrees with the shock at rest (without any compression). Angle "C" is measured between a line running through the longitudinal axis of the shock and a line running between the pivotal support 30 for the shock which forms a pivotal axis for such shock and the swing arm pivotal support 21 which forms a pivotal axis for the swing arm. The use of such an optimum angle assures that the shock absorber will progressively increase in resistance during the compression stroke to enable the effective handling of larger bumps which cause greater travel.

Referring now to FIGS. 1 and 4, an actuating arm 40 for brake 42 is pivotally supported on swing arm 19. Brake 42 is mounted on swing arm 19. The brake cable 43 is connected to arm 40 as is cable 44 which is connected to the brake. Actuating arm 40 provides additional leverage for brake actuation so that less braking force is required at the hand operated brake lever. Further, if the main brake cable should snap, it is less likely to become tangled in the wheel spokes.

The device of the invention thus provides improved suspension and shock absorption characteristics while minimizing the effects of chain pull on the operation of the suspension system of a bike during pedaling, particularly when climbing.

While the invention has been described and illustrated in detail, it is to be clearly understood that this is intended by way of illustration and example only and not by way of limitation, the scope of the invention being limited only by the terms of the following claims.

I claim:

1. In a bicycle having front and rear wheels, and a generally triangular frame formed from a plurality of posts, a set tube forming one of said posts, the other of said posts extending from said seat tube towards the front wheel of said bicycle, said seat tube having an upper portion, a lower portion offset from said upper portion towards the rear wheel of said bicycle, and a central portion joining said upper and lower portions together, a suspension system comprising:

a swing arm pivotally attached at one end thereof to one of the other of said posts and fixedly attached at the other end thereof to the rear wheel axle of said bicycle, and a shock absorber, means for pivotally supporting one end of said shock absorber on said seat tube, means for pivotally supporting the other end of said shock absorber on said swing arm, said shock absorber being positioned adjacent to the central portion of the seat tube on the side of said seat tube facing the rear wheel of said bicycle.

2. The suspension system of claim 1 wherein said swing arm is formed from a pair of opposing bars and a gusset joining said bars together, the seat tube being fitted between said bars with the central portion thereof being positioned adjacent to said gusset in a direction therefrom towards the front wheel of said bicycle.

3. The suspension system of claim 1 said shock absorber having a longitudinal axis, a pivotal support for said swing arm, said pivotal support forming a pivotal axis for said swing arm, wherein the angle between a line running through the longitudinal axis of said shock absorber and a line running between the pivotal axis of the pivotal support of the shock absorber on said swing arm and the pivotal axis of said swing arm is slightly less than 90 degrees when the shock absorber is fully compressed.

4. The suspension system of claim 1 wherein said frame includes a cross bar forming a post of said frame running between said seat tube and one of the others of said posts thereof, said swing arm being pivotally supported on said cross bar.

5. The suspension system of claim 1 said swing arm having a longitudinal axis; wherein said longitudinal axis of said swing arm and the direction of chain pull of said bicycle are approximately parallel to each other.

6. The suspension system of claim 1 and further including a brake for braking said bicycle; a brake cable mounted on said bicycle for use in actuating said brake, and a brake actuating arm pivotally supported at one end thereof on said swing arm, said brake actuating arm being connected to said brake cable and said brake, thereby providing additional leverage for actuating said brake.

7. In a bicycle having front and rear wheels, and a generally triangular frame formed from a plurality of posts, a seat tube forming one of the said posts, the others of said posts extending from said seat tube towards the front wheel of said bicycle, said seat tube having an upper portion, a lower portion offset from said upper portion towards the rear wheel of said bicycle, and a central portion joining said upper and lower portions together, a suspension system comprising:

a swing arm pivotally attached at one end thereof to one of the other of said posts and fixedly attached at the other end thereof to the rear wheel axle of said bicycle, a shock absorber, means for pivotally supporting one end of said shock absorber on said seat tube, means for pivotally supporting the other end of said shock absorber on said swing arm, said shock absorber being positioned adjacent to the central portion of the seat tube on the side of said seat tube facing the rear wheel of said bicycle, a brake mounted on said bicycle for use in braking said bicycle, a brake actuating arm pivotally supported at one end thereof on the swing arm, a brake cable for use in actuating the brake, said actuating arm being connected to said brake cable, and means for connecting said actuating arm to said brake, thereby providing additional leverage for actuating the brake.

8. The suspension system of claim 7 wherein said swing arm is formed from a pair of opposing bars and a gusset joining said bars together, the central portion of said seat tube being fitted between said opposing bars adjacent to said gusset in a direction therefrom towards the front wheel of the bicycle.

9. The suspension system of claim 7 wherein said frame includes a cross bar forming a post of said from running between said seat tube and one of the others of said posts thereof, said swing arm being pivotally supported on said cross bar.

10. The suspension system of claim 7 said swing arm having a longitudinal axis wherein the longitudinal axis of said swing arm and the direction of chain pull of said bicycle are approximately parallel to each other.

11. The suspension system of claim 7 and further including a shock absorber pivotally mounted between the swing arm and the bicycle frame.

* * * * *